(12) United States Patent
Clark et al.

(10) Patent No.: US 6,292,563 B1
(45) Date of Patent: Sep. 18, 2001

(54) VOLUME ATTENUATOR FOR FLIP-STYLE HAND-HELD PHONE

(75) Inventors: John M. Clark, Fort Worth; Wayne Wilson, North Richland Hills, both of TX (US)

(73) Assignee: RadioShack Corporation, Fort Worth, TX (US)

( * ) Notice: Subject to any disclaimer, the term of this patent is extended or adjusted under 35 U.S.C. 154(b) by 0 days.

(21) Appl. No.: 09/173,638

(22) Filed: Oct. 16, 1998

(51) Int. Cl.⁷ ...................................................... H04M 1/00
(52) U.S. Cl. ............................................................ 379/433
(58) Field of Search ..................................... 379/433, 428, 379/422, 420; 455/575, 90

(56) References Cited

U.S. PATENT DOCUMENTS

| | | |
|---|---|---|
| D. 326,092 | 5/1992 | Kikuchi et al. . |
| D. 369,598 | 5/1996 | Nagele et al. . |
| 4,899,368 * | 2/1990 | Krohn et al. .......................... 379/422 |
| 5,027,394 | 6/1991 | Ono et al. . |
| 5,260,998 | 11/1993 | Takagi . |
| 5,818,924 * | 10/1998 | King et al. ............................ 379/420 |

* cited by examiner

*Primary Examiner*—Jack Chiang
(74) *Attorney, Agent, or Firm*—John F. McGowan

(57) ABSTRACT

In a folding communication apparatus with a housing rotatably connected by a hinge to a movable form, wherein movement of the hinge alters the speaker volume. A folding portable radio set includes a switch for reducing the speaker volume when the communication apparatus is in the open position.

16 Claims, 7 Drawing Sheets

VOLUME ATTENUATOR FOR FLIP-STYLE HAND-HELD PHONE

FIELD OF THE INVENTION

The present invention relates to radio and wireless telephone communications, particularly in the automatic attenuation of speaker volume when the radio or wireless telephone is opened to the operating position.

BACKGROUND OF THE INVENTION

In recent years, portable communications devices for use by the general public have been developed and their usage has become widespread. The cellular telephone systems have become a ubiquitous mode of communication in our society, but cellular phones are not the only widely used form of communications. Recently new UHF frequencies, in the 462 to 467 MHZ range, have been opened for the "Family Radio Service". The Family Radio Service (FRS) is a 14 channel, UHF, low power, two-way radio service designed to allow communications between multiple users, such as family members at an amusement park or groups on outings. Use of cellular telephones has become very common and socially accepted in most public areas such as shopping malls, amusement parks, and athletic events. However, many people feel uncomfortable using a two-way radio, such as FRS, to communicate in such surroundings. A solution is to make the two-way radio appear to be a cellular telephone. Small, inexpensive component parts are available to produce portable radio sets which are the same size as most mobile telephones.

One disadvantage of modifying a two-way radio to appear as a wireless telephone is the speaker volume must be sufficient to be heard when the radio is some distance from the ear, such as when the radio is stored or attached to a belt or in a handbag but not too loud when the radio is held to the ear as is done with wireless telephones. If the volume is audible enough to be heard when the person is not actually listening to the radio, it may be too loud when the speaker is placed near the ear. This is also true for cellular telephones, where the "ringing" tone must be loud enough to alert the user that a call is waiting and yet may be too loud if not attenuated once the receiver is placed near the ear. This invention is directed to a low cost, simple solution to this problem.

DESCRIPTION OF THE RELATED ART

Many people desire their cellular telephones be as small as possible. The smallest designs are usually divided in two, with the housings joined by a hinge whereby the two housings fold parallel to one another, decreasing the length of the unit by one half. The first housing and the second housing are connected rotatably to each other by a hinge. The telephone is unfolded from the stored position to allow access to the keypad and place the microphone and speaker far enough apart to correspond to the distance between the ear and mouth of the user. Other telephones use a cover which rotates open and closed to cover and protect the keypad and microphone when the telephone is not in use. This movement of a hinge can be used to activate a switch to attenuate the volume of the radio.

SUMMARY OF THE INVENTION

It is an object of the present invention to provide a portable communication device which adjusts the volume of the speaker in which a switch is activated by moving an electrical connecting member in the hinge of a folding type communication device.

The folding radio of the present invention accomplishes the above recited objects by having an electrical switch that connects a first housing to a second housing. The first and second housings, which are attached at a hinge, each have one end of the electrical switch. The movement of the hinge either opens or closes an electrical switch causing the volume of the speaker to increase or decrease.

The wireless telephone has an electrical connecting member which connect related electrical components in the housings. In many cases of folding type telephones, the electrical connecting member is wired through the hinge of the telephone.

DESCRIPTION OF THE PREFERRED EMBODIMENT

Figure 1:
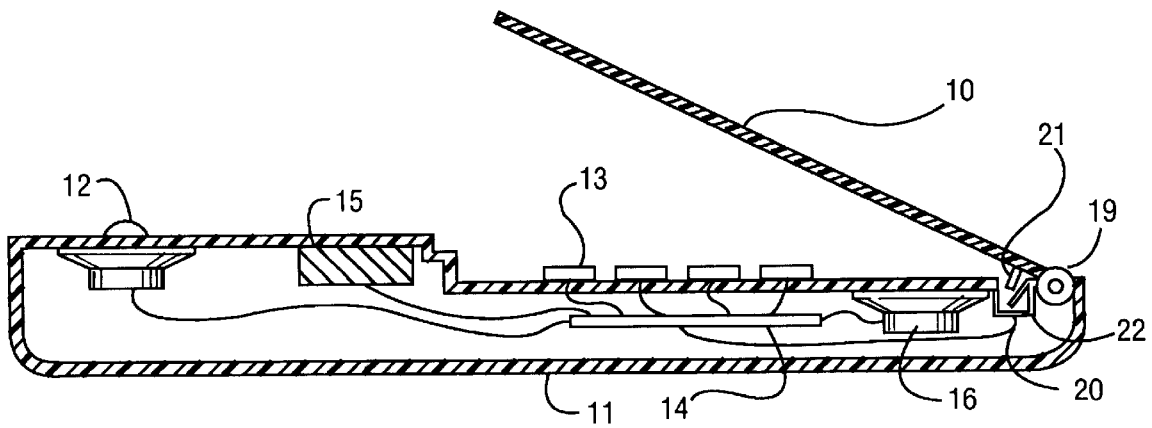
FIG. 1 is a sectional view of the prior art in the open, or in use, configuration.

FIG. 1 depicts a prior art wireless telephone or two way radio designed to appear to be a wireless telephone. The radio/telephone has a speaker 12 and control keypad 13 provided in the housing 11. Speaker 12, display 15 and microphone 16 are electrically connected to the printed circuit board 14. The printed circuit board 14 contains an amplification circuit which increases the power to speaker 12 when activated. An antenna (not shown) for wireless communications is also provided in housing 11. A hinge 19 rotatably connects housing 11 with cover 10. Cover 10 rotates 180 degrees about hinge 19. In the closed position, cover 10 lays above and protects the control keypad 13 and microphone 16. In the open position, the cover extends to form a plane with the housing 11. When cover 10 is in the closed position for storage, projection 21, integral to cover 10, moves into slot 22 to activate switch 20. There are numerous switches well known to those skilled in the art which will perform the desired function. Switch 20, when activated, allows power to proceed to the amplifier circuit on circuit board 14. Design and fabrication of a circuit board for radios and the amplifier circuit are well known in the art and will not be discussed in detail.

Figure 2:
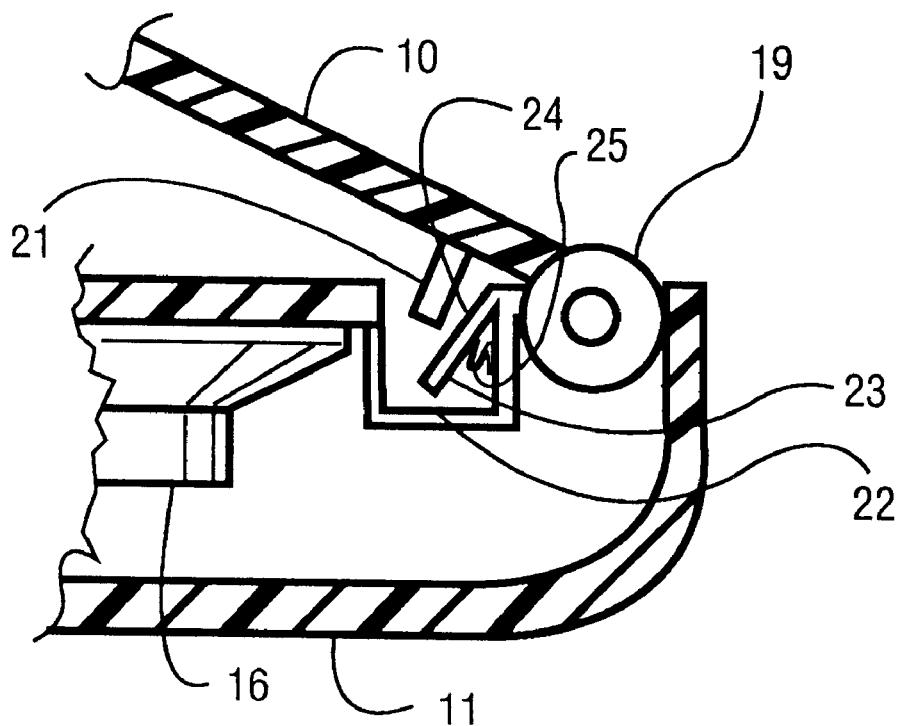
FIG. 2 is a sectional view of the prior art hinge and switch.

FIG. 2 (Prior Art) shows a detailed view of one embodiment of switch 20 wherein movable arm 24 which is angled to bisect the interior of opening 22. When projection 21 enters opening 22, movable arm 24 is forced against a wall of opening 22, closing electrical contact 23 and allowing current to flow powering the amplification circuit on circuit board 14. Spring 25 forces movable arm 24 back into the rest position breaking electrical contact when projection 21 is withdrawn from the center slot thereby removing power from the amplification circuit.

Figure 3:
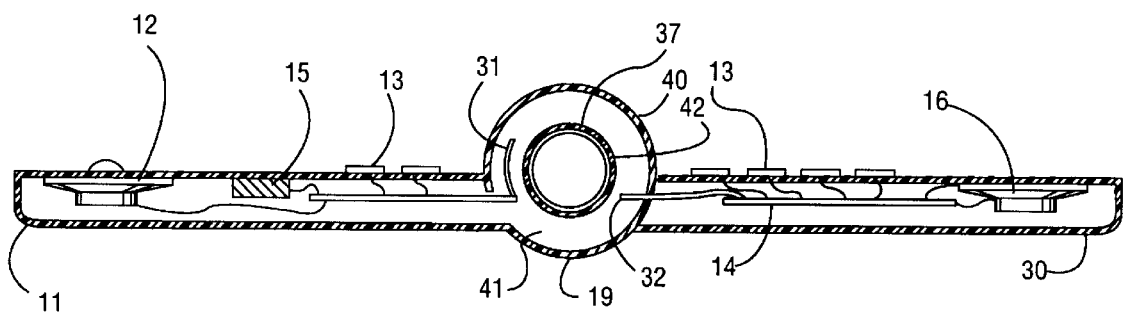
FIG. 3 is a sectional view of the preferred embodiment in the open, or in use, position.
Figure 4:
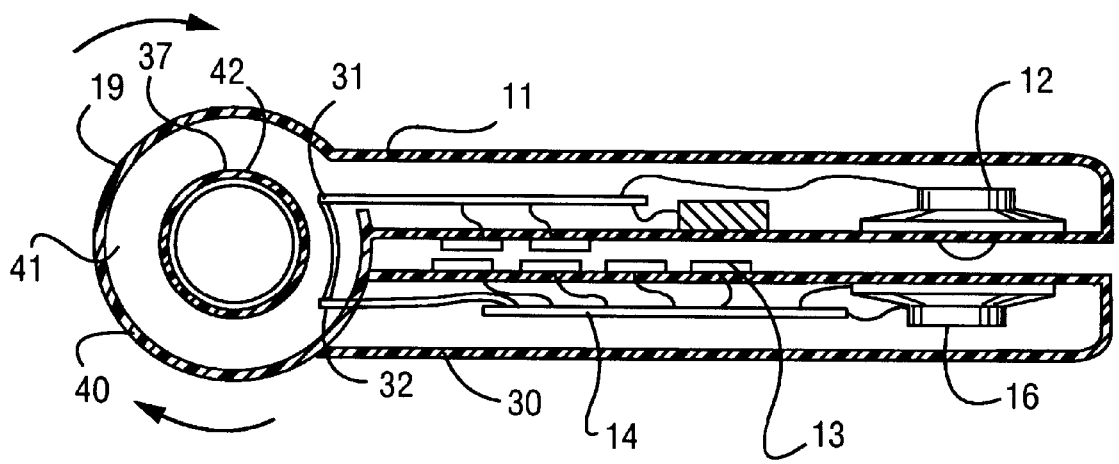
FIG. 4 is a sectional view of the preferred embodiment in the closed, or stored, position.
Figure 5:
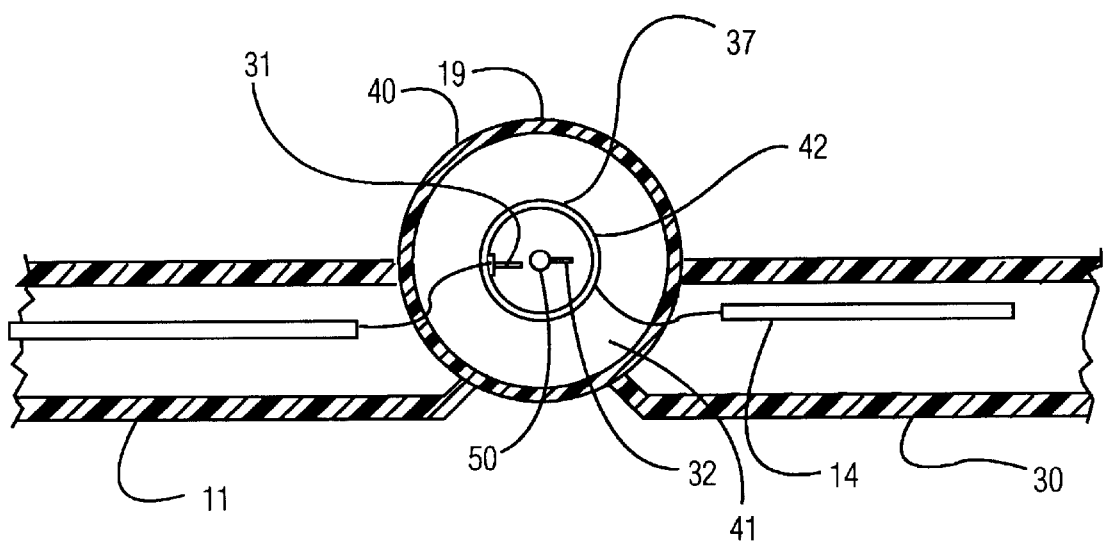
FIG. 5 is a sectional view of an alternate preferred embodiment of the present invention in the open configuration.
Figure 6:
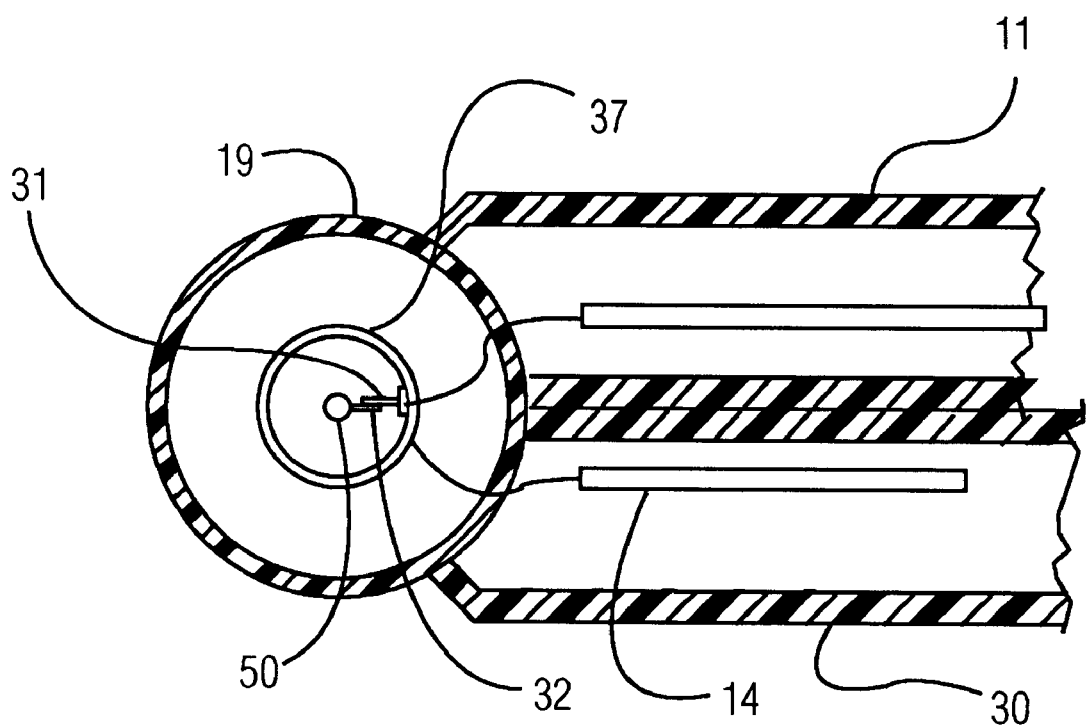
FIG. 6 is a sectional view of the alternate preferred embodiment of FIG. 5 in a closed configuration.
Figure 7:
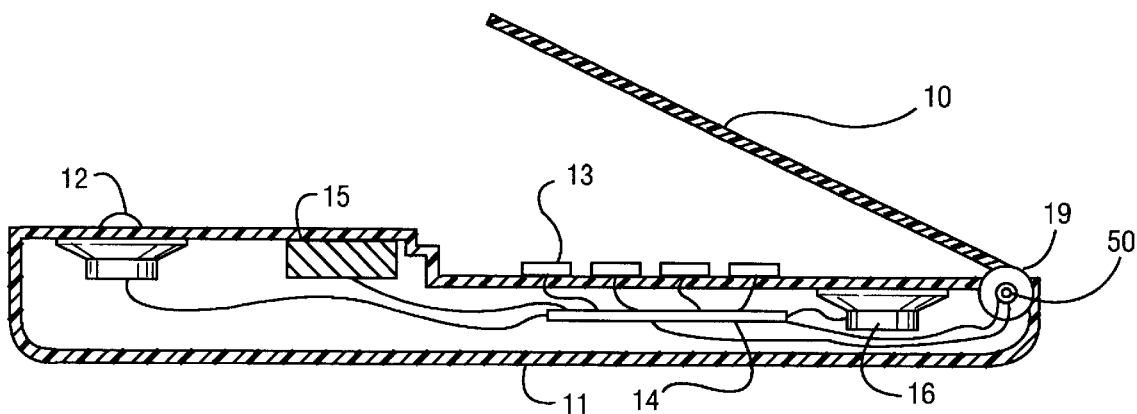
FIG. 7 is a sectional view of an alternate preferred embodiment of the present invention.

FIG. 3 depicts the preferred embodiment of the present invention. Hinge 19 rotatably connects first housing 11, having a speaker 12, to second housing 30 having a circuit board 14 and keypad 13. A hollow space in a shaft 37 is in the center of hinge 19 gives the hinge 19 a double cylindrical configuration. A battery for supplying power to the above mentioned electrical/electronic components can be inserted in the above-mentioned hollow space in the shaft 37. Electrical conducting wire 31 passes through the outer wall 40 of hinge 19 and into the space 41 defined by the inner wall of hinge 19 and the outer wall 42 of shaft 37. A switch 32 is located on the opposite side of hinge 19 adjacent to second housing 30. Switch 32 is electrically connected though outer wall 40 to circuit board 14. Keypad 13 is also electrically connected to circuit board 14. If the preferred embodiment is a cellular telephone, the keypad buttons will control the dialing function, power on and off and volume. If the preferred embodiment is a radio designed to look like a wireless telephone, the keypad 13 will control frequency selection, power on and off and volume. The keypad may incorporate a key with which the volume attenuation circuit can be deactivated in the closed position, if low volume is desired, such as in a restaurant. In FIG. 4, the telephone/radio of FIG. 3 is closed and conductor 31 is connected to switch 32 enabling the amplification circuit. An alternate embodiment with a switch in the hinge is shown in FIG. 5. Hinge 19 rotates about pin 50. Attached to pin 50 is switch 32, which in turn is connected electrically to circuit board 14. Conductor 31 is attached to the inner wall of shaft 37. As hinge 19 is rotated, conductor 31 moves in a circular motion about shaft 37. When first housing 11 is adjacent to second housing 30, conductor 31 is in contact with switch 32 (as shown in FIG. 6) completing the circuit and energizing an amplification circuit on circuit board 14, boosting the power of the speaker output signal. A telephone/radio with a cover 10, can also incorporate the alternate embodiment hinge/switch combination of FIG. 5, as shown in FIG. 7.

It will be understood that the invention is not limited to the precise embodiments disclosed above and that alternative embodiments and methods will be readily apparent to those skilled in the art without departing from the spirit and scope of the invention as defined in the claims.

We claim:

1. A communications device, comprising:
    a first housing;
    a speaker in said first housing;
    a second housing;
    a hinge rotatably connecting said first housing and said second housing; and
    an electrical switch disposed within said hinge wherein rotating said first housing relative to said second housing actuates said switch thereby controlling an amplifier to adjust the volume of said speaker.

2. The communications device of claim 1 wherein said communications device is a wireless telephone.

3. The communications device of claim 1 wherein said communications device is a radio receiver.

4. The communications device of claim 1, and wherein said hinge is a double cylindrical hinge.

5. The communications device of claim 1, and wherein said switch has a first and second positions, said first position of said switch being activated when said cover is opened decreasing the volume of said speaker, and said second position of said switch being activated when said cover is closed increasing the volume of said speaker.

6. The communications device of claim 1, and wherein:
    said hinge is a double cylindrical hinge; and
    said switch has a first and second positions, said first position of said switch being activated when said cover is opened decreasing the volume of said speaker, and said second position of said switch being activated when said cover is closed increasing the volume of said speaker.

7. A method of automatically adjusting the volume of a communications device, wherein said communications device has a housing, a cover for protecting a keypad, a speaker, a hinge, said hinge having a conductor, an amplification circuit and a two position switch disposed within the hinge, comprising the steps of:
    opening said cover thereby rotating said hinge, said hinge's rotation causing movement of said conductor to contact said switch;
    powering said amplification circuit when said conductor is in contact with said switch; and
    depowering said amplification circuit when said conductor is not in contact with said switch.

8. The communications device of claim 1 further comprising:
    a manual override operable to deactivate said switch.

9. The communications device in claim 1, and wherein rotation of said first housing to a position adjacent to said second housing closes said switch, energizing said amplifier to increase the volume of said speaker.

10. The communications device in claim 1, and wherein rotation of said first housing to a position not adjacent to said second housing opens said switch, de-energizing said amplifier to decrease the volume of said speaker.

11. The communications device in claim 1, and wherein said hinge is a double cylindrical hinge, further comprising:
    a first cylindrical portion;
    a second cylindrical portion substantially concentric with said first cylindrical portion, and wherein
        said switch is disposed within the annular spaced defined between said first cylindrical portion and said second cylindrical portion.

12. A communications device, comprising:
    a housing, having a speaker therein;
    a cover for protecting a keypad;
    a hinge rotatably connecting said housing and said cover;
    a switch disposed within said hinge, and
    an amplifier coupled to said switch and said speaker, and wherein
        rotation of said cover with respect to said housing actuates said switch thereby controlling said amplifier to adjust the volume of said speaker.

13. The communications device in claim 12, and wherein rotation of said cover to a position adjacent to said housing closes said switch, energizing said amplifier to increase the volume of said speaker.

14. The communications device in claim 12, and wherein rotation of said cover to a position not adjacent to said housing opens said switch, de-energizing said amplifier to decrease the volume of said speaker.

15. The communications device in claim 12, and wherein said hinge is a double cylindrical hinge, further comprising:
    a first cylindrical portion;
    a second cylindrical portion substantially concentric with said first cylindrical portion, and wherein
        said switch is disposed within the annular spaced defined between said first cylindrical portion and said second cylindrical portion.

16. The communications device of claim 12 further comprising:
    a manual override operable to deactivate said switch.

* * * * *